United States Patent
Bomidi et al.

(10) Patent No.: US 10,119,335 B2
(45) Date of Patent: Nov. 6, 2018

(54) BEARINGS FOR DOWNHOLE TOOLS, DOWNHOLE TOOLS INCORPORATING SUCH BEARINGS, AND RELATED METHODS

(71) Applicant: Baker Hughes Incorporated, Houston, TX (US)

(72) Inventors: John Abhishek Raj Bomidi, Spring, TX (US); Jon David Schroder, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 212 days.

(21) Appl. No.: 15/047,338

(22) Filed: Feb. 18, 2016

(65) Prior Publication Data

US 2017/0241208 A1  Aug. 24, 2017

(51) Int. Cl.
*E21B 10/22* (2006.01)
*E21B 10/24* (2006.01)
*E21B 10/28* (2006.01)
*F16C 33/04* (2006.01)
*F16C 33/36* (2006.01)

(52) U.S. Cl.
CPC .............. *E21B 10/22* (2013.01); *E21B 10/28* (2013.01); *F16C 33/043* (2013.01); *F16C 33/366* (2013.01); *E21B 10/24* (2013.01); *F16C 2352/00* (2013.01)

(58) Field of Classification Search
CPC .......... E21B 10/22–10/25; E21B 10/28; F16C 33/366; F16C 33/043; F16C 2352/00; F16C 17/04
See application file for complete search history.

(56) References Cited

U.S. PATENT DOCUMENTS

| | | | | |
|---|---|---|---|---|
| 2,030,722 A | * | 2/1936 | Scott | E21B 10/28 175/335 |
| 3,193,028 A | * | 7/1965 | Radzimovsky | E21B 10/22 175/228 |
| 3,866,987 A | | 2/1975 | Garner | |
| 4,249,781 A | | 2/1981 | Brandenstein et al. | |
| 4,367,904 A | * | 1/1983 | Olschewski | E21B 10/20 175/370 |
| 4,386,663 A | | 6/1983 | Ippolito | |

(Continued)

OTHER PUBLICATIONS

International Search Report for International Application No. PCT/US2017/018159 dated May 24, 2017, 4 pages.

(Continued)

*Primary Examiner* — George S Gray
(74) *Attorney, Agent, or Firm* — TraskBritt

(57) ABSTRACT

A bearing system configured for use on a downhole tool including a rolling cutter member having a plurality of cutting structures thereon comprises a first plurality of bearings disposed between a head washer and an at least substantially planar shaft washer, and a second plurality of bearings disposed between the at least substantially planar shaft washer and a rolling cutter washer. A downhole tool, such as an earth-boring rotary rolling cutter drill bit includes such a bearing system between a rolling cutter and a head of a bit body. Methods of forming such a downhole tool include the assembly of such a bearing system between a rolling cutter and a head of a bit body.

21 Claims, 6 Drawing Sheets

(56) References Cited

U.S. PATENT DOCUMENTS

| | | | |
|---|---|---|---|
| 4,399,879 A | 8/1983 | Liljekvist et al. | |
| 4,700,790 A | 10/1987 | Shirley | |
| 5,626,201 A | 5/1997 | Friant et al. | |
| 5,906,245 A | 5/1999 | Tibbitts et al. | |
| 7,011,170 B2 | 3/2006 | Ledgerwood, III et al. | |
| 7,413,037 B2 | 8/2008 | Lin et al. | |
| 7,845,435 B2 | 12/2010 | Zahradnik et al. | |
| 8,950,515 B2 | 2/2015 | Schroder | |
| 8,955,622 B2 | 2/2015 | Schroder | |
| 2006/0060359 A1 | 3/2006 | Lin et al. | |
| 2008/0264695 A1* | 10/2008 | Zahradnik | E21B 10/14 175/336 |
| 2011/0223818 A1 | 9/2011 | Lonngren et al. | |
| 2012/0312599 A1 | 12/2012 | Trinh et al. | |
| 2013/0105229 A1* | 5/2013 | Schroder | E21B 10/22 175/359 |
| 2014/0216827 A1 | 8/2014 | Zhang et al. | |
| 2015/0053486 A1 | 2/2015 | DiGiovanni et al. | |
| 2015/0218889 A1 | 8/2015 | Carroll et al. | |

OTHER PUBLICATIONS

International Written Opinion for International Application No. PCT/US2017/018159 dated May 24, 2017, 9 pages.

* cited by examiner

BEARINGS FOR DOWNHOLE TOOLS, DOWNHOLE TOOLS INCORPORATING SUCH BEARINGS, AND RELATED METHODS

FIELD

Embodiments of the present disclosure relate generally to bearing systems for earth-boring tools employing at least two rows of thrust bearings in association with a rotatable component, earth-boring tools including such bearing systems, and to methods of making and using such bearing systems and earth-boring tools.

BACKGROUND

Roller cone drill bits for drilling earth formations conventionally have roller cones (which may also be characterized as rolling cutters), each cone mounted on a head or head on a distal end of a leg protruding from or secured to a bit. As the drill bit rotates to drill an earth formation under applied weight on bit (WOB), the roller cones are caused to rotate on their respective heads responsive to WOB and engagement with the formation. The outer surfaces of the cones include cutting structures, which are conventionally in the form of teeth formed integrally with the roller cones or inserts disposed in recesses formed in the outer surfaces of the roller cones. The cutting structures impact, gouge and crush the underlying earth formation material as the drill bit is rotated within the wellbore to form the borehole.

A bearing system is included between each cone and its associated head. The bearing system may include a thrust bearing and a radial bearing. The bearings of the bearing systems are located and configured to carry the load to which the roller cones are subjected while the bit is rotated under WOB, while allowing the roller cones to rotate on the heads. Specifically, the thrust bearing carries the axial component of the load applied parallel to the head, while the radial bearing carries the radial component of the load applied perpendicular to the head. The high loads present during drilling cause friction in the rotating components and generate heat, which may cause deterioration of the bearings. Bearing deterioration may cause bit failure, resulting in time-consuming and expensive removal and replacement of the bit from the borehole.

Bearing systems used in roller cone bits may be sealed bearings or open bearings. Sealed bearing systems conventionally include a lubricant reservoir for supplying lubricant, such as a bearing grease, to the bearing surfaces between the roller cones, the heads and the bearing elements. A pressure compensator may be used to equalize the lubricant pressure with the fluid pressure within the borehole to prevent pressurized borehole fluids from invading the lubricated volumes between the head, cone and bearings. Open bearing systems, by contrast, have no seals or bearing grease. Open bearing systems may use drilling fluid, such as a drilling mud, to both cool and lubricate the bearings.

Additionally, a small amount of clearance (on the order of a few thousandths of an inch) is conventionally provided between mating components of the cones and their corresponding heads due to manufacturing and assembly constraints. This clearance enables a small amount of movement or "play" between the cones and their corresponding heads in both the axial direction parallel to the longitudinal axis of the head and in the radial direction perpendicular to the longitudinal axis of the head. This play between the cones and heads may result in misalignment between the bearing system components during drilling, which may result in excessive wear of the misaligned bearing components.

Recently, new connection methods for connecting roller cones to corresponding heads of a bit body have been developed in which the cones are retained on their corresponding heads using tensioner bolts, such that the tensioner bolts apply forces urging the cones onto their heads to substantially eliminate play between the cones and the heads. Examples of such connection methods are disclosed in U.S. Pat. No. 8,950,515, issued Feb. 10, 2015 to Schroder, and in U.S. Pat. No. 8,955,622, issued Feb. 17, 2015 to Schroder, the disclosure of each of which is hereby incorporated herein in its entirety by this reference.

BRIEF SUMMARY

In accordance with some embodiments, the present disclosure includes a bearing system configured for use on a downhole tool including a rolling cutter member having a plurality of cutting structures. The bearing system includes a head washer, an at least substantially planar shaft washer, and a first plurality of bearings disposed between the head washer and the at least substantially planar shaft washer. The bearing system further includes a rolling cutter washer, and a second plurality of bearings disposed between the at least substantially planar shaft washer and the rolling cutter washer.

In additional embodiments, the present disclosure includes downhole tools including a tool body including at least one head, a rolling cutter mounted on the at least one head, and a bearing system disposed between the at least one head and the rolling cutter mounted on the at least one head. The bearing system includes a head washer, an at least substantially planar shaft washer, and a first plurality of bearings disposed between the head washer and the at least substantially planar shaft washer. The bearing system further includes a rolling cutter washer, and a second plurality of bearings disposed between the at least substantially planar shaft washer and the rolling cutter washer.

Further embodiments of the present disclosure include methods of forming an earth-boring tool configured for use in a subterranean formation. In accordance with such methods, a tensioner bolt may be inserted into a rolling cutter, a rolling cutter washer may be inserted into the rolling cutter, a plurality of bearings may be provided on the rolling cutter washer within the rolling cutter, and an at least substantially planar shaft washer may be inserted into the rolling cutter such that the bearings are disposed between the rolling cutter washer and the at least substantially planar shaft washer. A retaining member may be provided within the rolling cutter to retain the at least substantially planar shaft washer, the plurality of bearings, the rolling cutter washer, and the tensioner bolt within the rolling cutter. A head washer may be positioned over and around a head of a tool body of the earth-boring tool, and an additional plurality of bearings may be provided on the head washer. The rolling cutter may be positioned on the head such that the tensioner bolt extends through the head, and such that the additional plurality of bearings is disposed between the head washer and the at least substantially planar shaft washer retained within the rolling cutter. The tensioner bolt may be secured to the head to secure the roller cutter to the head, and the tensioner bolt may be tensioned to compress the additional plurality of bearings between the head washer and the at least substantially planar shaft washer, and to compress the plurality of bearings between the at least substantially planar shaft washer and the rolling cutter washer.

BRIEF DESCRIPTION OF THE DRAWINGS

While the specification concludes with claims particularly pointing out and distinctly claiming what are regarded as embodiments of the present invention, various features and advantages of disclosed embodiments may be more readily ascertained from the following description when read in conjunction with the accompanying drawings, in which:

DETAILED DESCRIPTION

The illustrations presented herein are not meant to be actual views of any particular downhole tool, drill bit, bearing system, or other component, but are merely idealized representations that are employed to describe the disclosed embodiments. Thus, the drawings are not necessarily to scale and relative dimensions may have been exaggerated for the sake of clarity. Additionally, elements common between figures may retain the same or similar numerical designation.

The term "downhole tool," as used herein, means includes any type of downhole tool employing a component rotatable with respect to another component with a bearing system as described herein therebetween, and includes, for example, earth-boring rotary drill bits including rolling cutters, Moineau-type "mud" motors, turbine motors, submersible pumps, coring bits, reamers, and other drilling bits and tools employing rotatable components, as known in the art.

Figure 1:
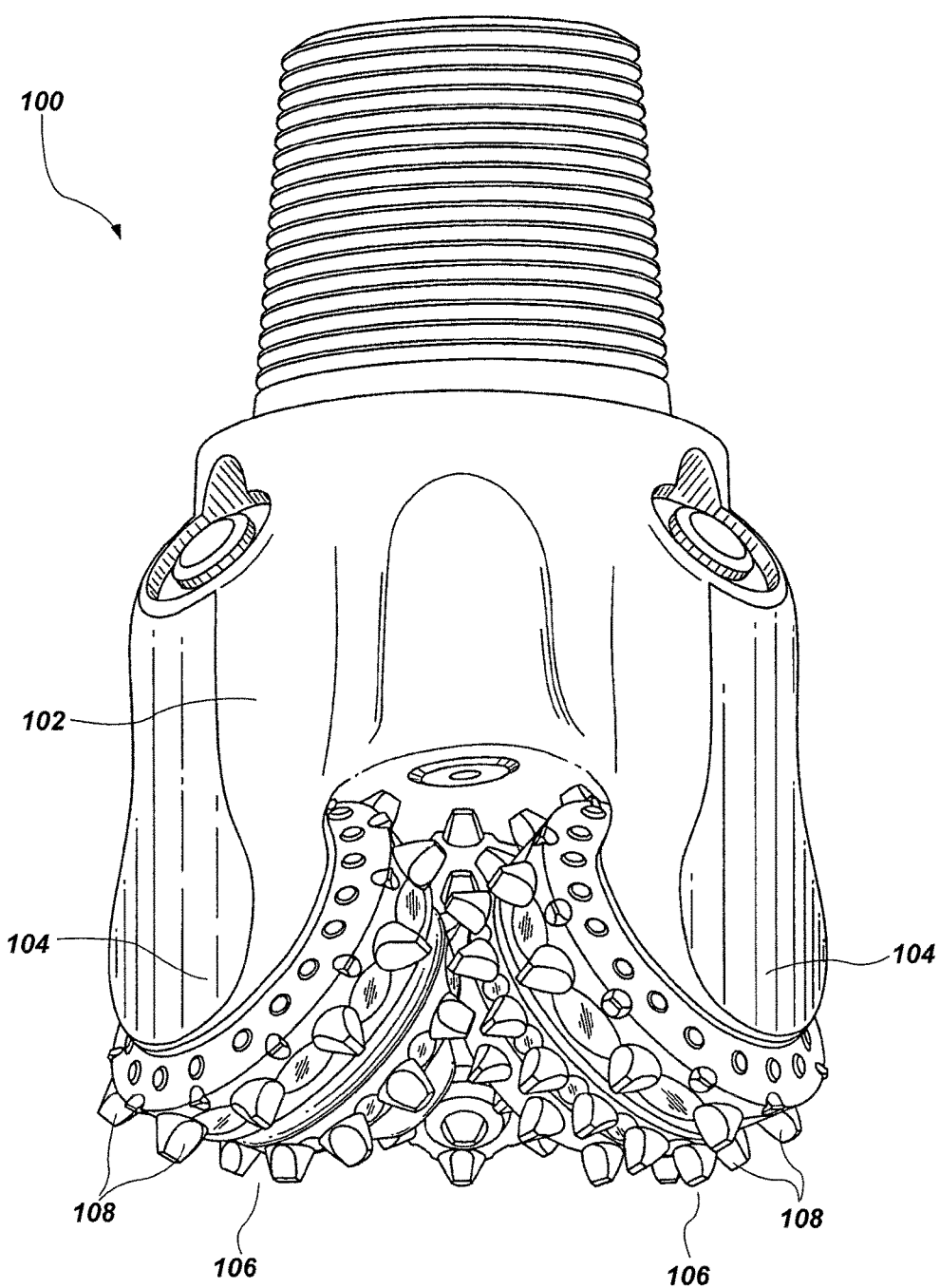
FIG. 1 is a perspective view of a downhole tool in the form of an earth-boring rotary rolling cutter drill bit including a bearing system as described herein.

FIG. 1 illustrates an earth-boring tool configured for use in a subterranean formation in the form of an earth-boring rotary drill bit 100. The drill bit 100 is a rolling cutter drill bit, and includes a tool body 102 having integral leg members 104 and rolling cutters 106 mounted on heads protruding from the distal ends of corresponding leg members 104. As the drill bit 100 is rotated within a wellbore, the rolling cutters 106 rotate on the corresponding heads. As the rolling cutters 106 rotate, cutting structures 108 disposed on the rolling cutters 106 gouge, crush and scrape away formation material so as to drill the borehole in the subterranean formation. The cutting structures 108 illustrated in FIG. 1 comprise inserts (e.g., cemented tungsten carbide and/or polycrystalline diamond inserts), although in other embodiments, the cutting structures 108 may comprise integral teeth formed on the rolling cutters 106 using machining processes. Hardfacing material may, optionally, be applied on the rolling cutters 106.

In accordance with embodiments of the present disclosure, a bearing system as described herein with reference to any of FIGS. 2 through 5 is disposed between each of the rolling cutters 106 and the corresponding heads.

Figure 2:
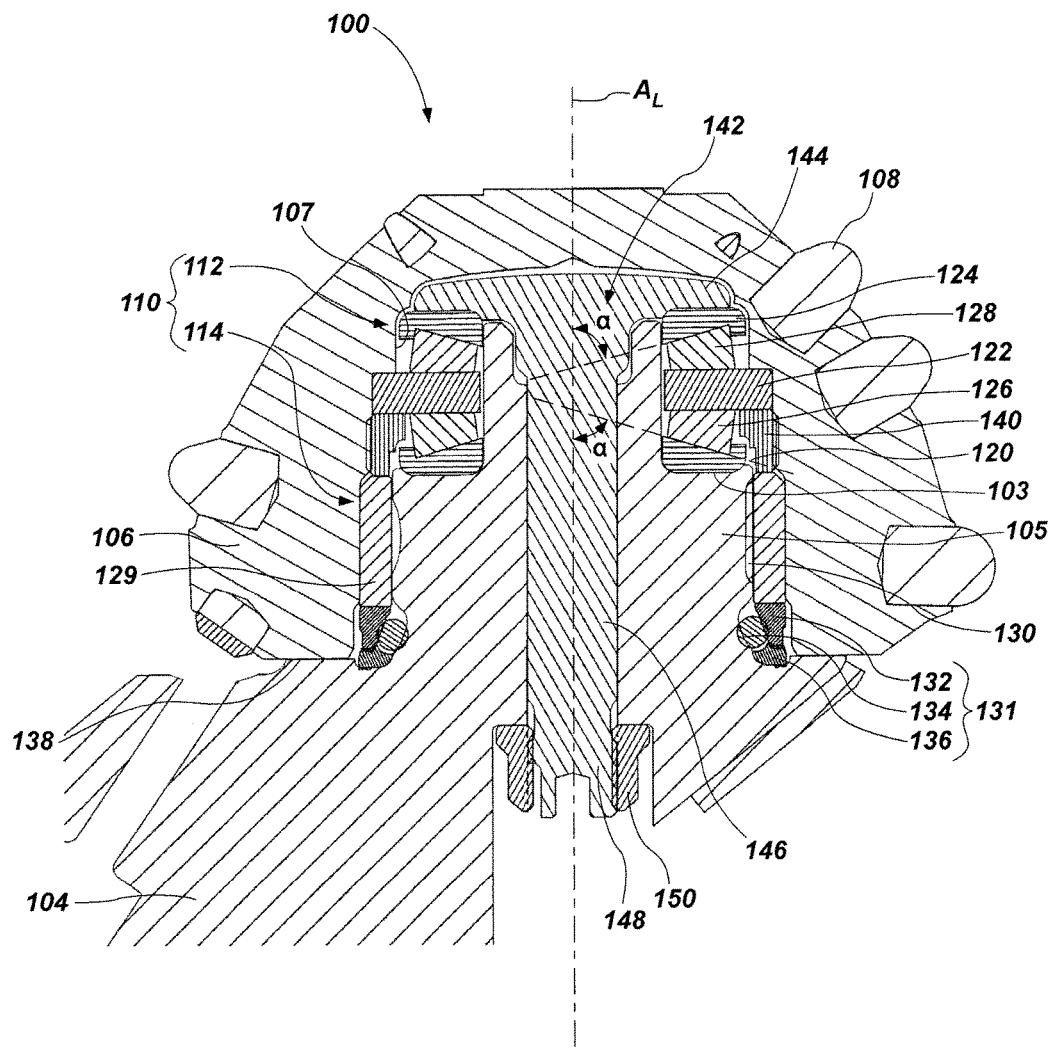
FIG. 2 is a cross-sectional view of a portion of the drill bit of FIG. 1 illustrating a rolling cutter mounted on a corresponding head of a bit body of the drill bit with a bearing system as described herein between the rolling cutter and the head.

FIG. 2 illustrates a bearing system 110 disposed between a rolling cutter 106 and a head 105 protruding from a leg 104 of the tool body 102. The bearing system 110 is configured to bear forces acting between the head 105 and the rolling cutter 106 as the rolling cutter 106 rotates relative to the head 105 during use of the drill bit 100 within a subterranean formation. In further detail, the bearing system 110 includes a thrust bearing 112 and a radial bearing 114. The thrust bearing 112 is located and configured for bearing forces acting between the rolling cutter 106 and the head 105 in directions generally parallel to the longitudinal axis $A_L$ of the head 105 (and the axis of rotation of the rolling cutter 106), which is referred to herein as the "axial" direction. The radial bearing 114 is located and configured for bearing forces acting between the rolling cutter 104 and the head 105 in directions generally perpendicular to the longitudinal axis $A_L$ of the head 105, which is referred to herein as the "radial" direction.

As shown in FIG. 2, the thrust bearing 112 includes a head washer 120 disposed on the head 105, an at least substantially planar shaft washer 122 retained within the rolling cutter 106 and disposed around the head 105, and a rolling cutter washer 124 retained within the rolling cutter 106. The thrust bearing 112 further includes a first plurality of bearings 126 disposed between the head washer 120 and the shaft washer 122, and a second plurality of bearings 128 disposed between the shaft washer 122 and the rolling cutter washer 124.

The head washer 120 comprises an annular ring member that rests upon a shoulder 103 of the head 105 around an annular protrusion of the head 105. The shaft washer 122 comprises an at least substantially planar annular ring member that also extends around the annular protrusion of the head 105, but is not secured thereto. The upper and lower surfaces of the shaft washer 122 are at least substantially planar (i.e., flat). The rolling cutter washer 124 also comprises an annular ring member that extends around the annular protrusion of the head 105.

In the embodiment of FIG. 2, the first plurality of bearings 126 and the second plurality of bearings 128 comprise tapered rolling bearing elements, each bearing element 126, 128 having the geometry of a truncated solid cone. The upper and lower surfaces of the shaft washer 122 may be at least substantially planar and oriented at least substantially perpendicular to the longitudinal axis $A_L$ of the head 105, such that the upper surfaces of the first plurality of bearings 126 and the lower surfaces of the second plurality of bearings 128 are oriented at least substantially perpendicular to the longitudinal axis $A_L$. The lower surfaces of the first plurality of bearings 126 and the upper surfaces of the second plurality of bearings 128 are oriented at an acute angle α to the longitudinal axis $A_L$. As a non-limiting example, the acute angle $\alpha$ may be in a range extending from about 65° and about 85°, such as about 75°.

The upper surface of the head washer 120 may comprise an angled, frustoconically-shaped surface oriented at the angle $\alpha$ to the longitudinal axis $A_L$ so as to be complementary to the lower surfaces of the first plurality of bearings 126. The head washer 120 may include an axially projecting lip that extends along at least a portion of a radially outer end surface of each of the first plurality of bearings 126. The axially projecting lip and the angled, frustoconically-shaped surface of the head washer 120 prevent the first plurality of bearings 126 from sliding in the radial direction during operation of the drill bit 100.

Similarly, the lower surface of the rolling cutter washer 124 may comprise an angled, frustoconically-shaped surface oriented at the angle $\alpha$ to the longitudinal axis $A_L$ so as to be complementary to the upper surfaces of the second plurality of bearings 128. The rolling cutter washer 124 may include an axially projecting lip that extends along at least a portion of a radially outer end surface of each of the second plurality of bearings 128. The axially projecting lip and the angled, frustoconically-shaped surface of the rolling cutter washer 124 prevent the second plurality of bearings 128 from sliding in the radial direction during operation of the drill bit 100.

The configuration of the thrust bearing 112 may find particular utility in rolling cutters 106 having relatively small diameters of less than about 13.0 centimeters (about 5 inches). For example, in some non-limiting example embodiments, the head washer 120, the shaft washer 122, and the rolling cutter washer 124 may have maximum outer diameters of about 6.5 centimeters or less (about 2.5 inches or less).

The radial bearing 114 may have any suitable configuration. As a non-limiting example, the radial bearing 114 may be a journal bearing comprising an annular sleeve 129 that is coupled to the rolling cutter 106 within the central cavity 107 thereof. For example, the annular sleeve 129 may be secured to the rolling cutter 106 within the central cavity 107 using a shrink fit and/or a press fit. The annular sleeve 129 may comprise a relatively hard and wear-resistant metal, such as a steel alloy.

Figure 5:
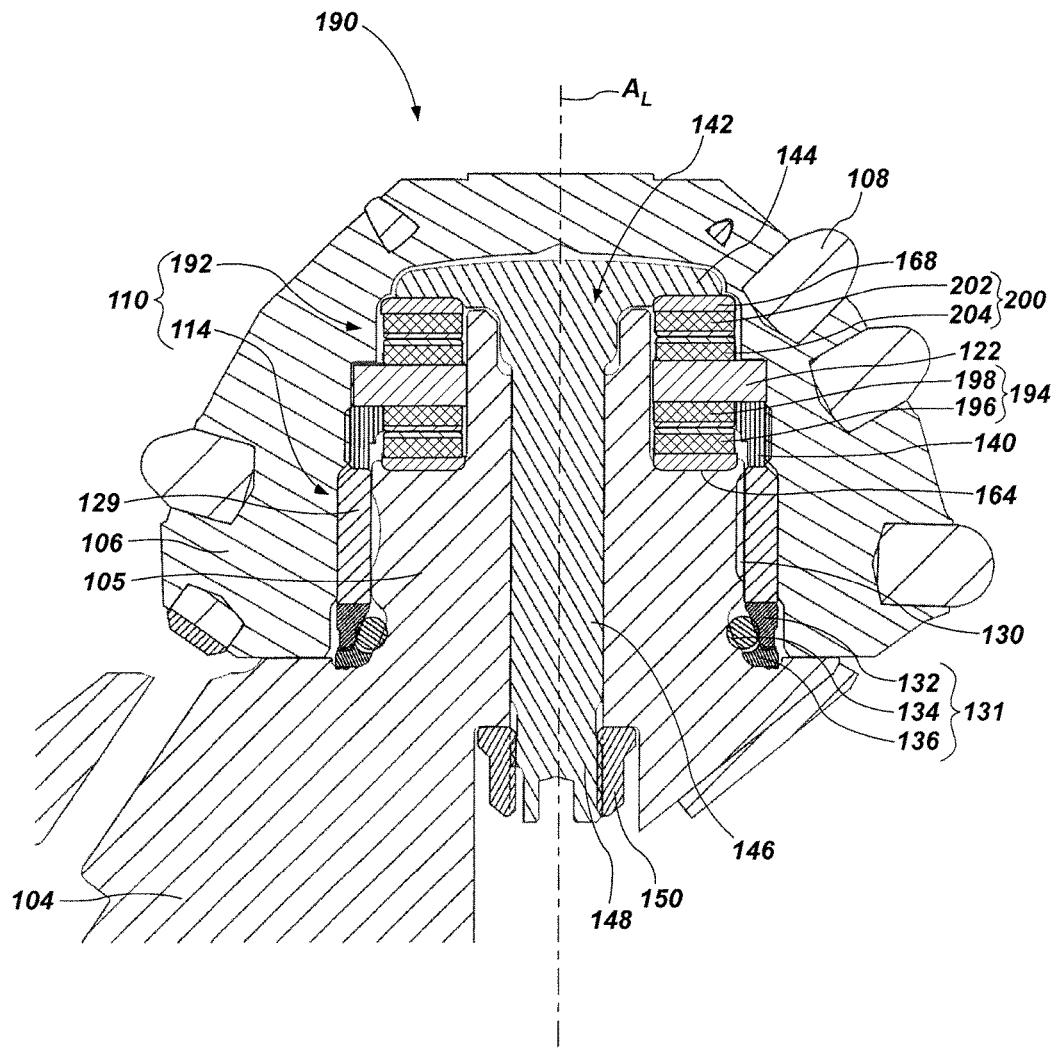
FIG. 5 is a cross-sectional view of a portion of a drill bit of similar to that of FIGS. 2 through 4 illustrating a rolling cutter mounted on a corresponding head of a bit body of the drill bit with another embodiment of a bearing system as described herein between the rolling cutter and the head.

Optionally, at least a portion of the outer side surface of the head 105 that is located and configured to bear against the annular sleeve 129 may comprise a hardfacing material 130 that has a composition that is relatively harder and/or more wear-resistant relative to the bulk material of the head 105, so as to extend the life of the radial bearing 114. For example, as shown in FIG. 5, at least the radially outward, load-bearing side of the head 105 may be provided with such a hardfacing material 130.

During operation, the interface between the annular sleeve 129 and the adjacent bearing surface of the head 105 may be lubricated with pressure compensated grease or oil. Optionally, one or more recesses may be formed in the radially inward, non-load-bearing side of the head 105, as is shown in FIG. 2. Furthermore, a radial clearance of, for example, from about one micron (1.0 μm) to about three hundred microns (300 μm), and more particularly from about twenty-five microns (25.0 μm) to about one hundred fifty microns (150 μm), may be provided between the inner surface of the annular sleeve 129 and the adjacent outer surface of the head 105 so as to provide a film of lubricating fluid of corresponding dimensions therebetween during operation of the drill bit. It is desirable for purposes of assembly of the rolling cutter 106 onto the head 105, as well as for proper operation of the radial bearing 114, to allow for a relatively small amount of clearance and play in the radial direction between inner surface of the annular sleeve 129 and the adjacent outer surface of the head 105.

One or more seals 131 may be employed to establish a fluid-tight seal between the rolling cutter 106 and the head 105 to prevent exposure of the bearing system 110 to fluids outside the drill bit 100. As a non-limiting example, the drill bit 100 may include an energized metal-faced seal 131 as described in U.S. Pat. No. 7,413,037, issued Aug. 19, 2008, the entire contents of which are hereby incorporated herein in their entirety by this reference. As described therein, the energized metal-faced seal 131 may include a rigid seal ring 132 that engages a rearward end of the annular sleeve 129 of the radial bearing 114, an elastomeric energizer ring 134, which may be an O-ring or another cross-sectional shaped ring, and a secondary seal ring 136. The seal 131 may be located between the base of the head 105 and an inner surface of the rolling cutter 106 proximate a rear surface 138 of the rolling cutter 106.

The rolling cutter 106 may be retained on the head 105 using a retaining member 140, a tensioner bolt 142, and a nut 150.

In particular, the retaining member 140 may secure an enlarged head 144 of the tensioner bolt 142, the rolling cutter washer 124, the second plurality of bearings 128, and the shaft washer 122 within a central cavity 107 of the rolling cutter 106. In some embodiments, the retaining member 140 may comprise a threaded annular ring member having a threaded outer side surface. Complementary threads may be formed on the inner side surface of the rolling cutter 106 within the central cavity 107, such that the threaded annular ring member may be threaded to the rolling cutter 106 within the central cavity 107. In this configuration, the enlarged head 144 of the tensioner bolt 142, the rolling cutter washer 124, the second plurality of bearings 128, and the shaft washer 122 within the central cavity 107 of the rolling cutter 106 are secured between the blind end or bottom of the central cavity 107 (the upper end of the central cavity 107 from the perspective of FIG. 2) and the retaining member 140. In other embodiments, the retaining member 140 may be secured to the rolling cutter 106 within the central cavity 107 using a threadless connection. For example, the retaining member 140 may be secured to the rolling cutter 106 within the central cavity 107 using a shrink fit and/or a press fit.

As noted above, the head washer 120 may be positioned on a shoulder 103 of the head 105. In some embodiments, the head washer 120 may be secured around an annular protrusion of the head 105 using a shrink fit and/or a press fit. In other embodiments, the head washer 120 may include threads on an inner side surface thereof, and complementary threads may be formed on an outer side surface of the annular protrusion of the head 105, such that the head washer 120 may be threaded onto the annular protrusion of the head 105 until it bears against the shoulder 103 of the head 105. After positioning the head washer 120 over and around the annular protrusion of the head 105 and on the shoulder 103 of the head 105, the first plurality of bearings 126 may be positioned on the head washer 120.

After inserting the tensioner bolt 142, the rolling cutter washer 124, the second plurality of bearings 128, and the shaft washer 122 into the central cavity 107 and securing these components within the central cavity 107 of the rolling cutter 106 using the retaining member 140, an elongated shaft 146 of the tensioner bolt 142 that extends from the enlarged head 144 may be inserted through a complementary hole of the head 105, and the nut 150 may be threaded onto a threaded end 148 of the elongated shaft 146. As the nut 150 is tightened on the threaded end 148 of the elongated shaft 146 of the tensioner bolt 142, the elongated shaft 146 of the tensioner bolt 142 is placed in a state of tension, and the enlarged head 144 of the tensioner bolt 142 compresses the components of the thrust bearing 112 between the enlarged head 144 and the shoulder 103 of the head 105.

The rolling cutter 106 may be secured to the head 105 generally, as described in the aforementioned U.S. Pat. Nos. 8,950,515 and 8,955,622. In addition, the thrust bearing 112 and/or the radial bearing 114 may be lubricated using grease or other lubricating fluid, and a pressure compensating system, as described in the aforementioned U.S. Pat. Nos. 8,950,515 and 8,955,622, may be used to ensure that the pressure of the grease or other lubricating fluid is maintained at substantial equal pressure to the fluid pressure outside the drill bit 100.

A keyed interface may be provided between the enlarged head 144 of the tensioner bolt 142 and the rolling cutter washer 124 so as to prevent rotation of the rolling cutter washer 124 about the head 105 during operation of the drill bit 100. The shaft washer 124 is fixed to the rolling cutter 106 by the retaining member 140, such that the shaft washer 124 rotates with the rolling cutter 106 between the first plurality of bearings 126 and the second plurality of bearings 128 during operation of the drill bit 100. Thus, during rotation of the rolling cutter 106 about the longitudinal axis $A_L$ of the head 105, the head washer 120 and the rolling cutter washer 124, and the tensioner bolt 142 are fixed in static position relative to the head 105, while the shaft washer 122 and the retaining member 140 rotate with the rolling cutter 106 about the head 105.

Due to the fact that the components of the thrust bearing 112 are compressed between the enlarged head 144 of the tensioner bolt 142 and the shoulder 103 of the head 105, there may be little to no play between the rolling cutter 106 and the head 105 in the axial direction. As discussed above, however, a predetermined amount of clearance between the inner side surface of the annular sleeve 129 and the adjacent outer side surface of the head 105 in the radial bearing 114 may be required for assembly of the rolling cutter 106 with the head 105, and/or for proper operation of the radial bearing 114. As a non-limiting example, a clearance of from about one micron (1.0 µm) to about three hundred microns (300 µm), and more particularly from about twenty-five microns (25.0 µm) to about one hundred fifty microns (150 µm), may be provided between the inner side surface of the annular sleeve 129 and the adjacent outer side surface of the head 105 in the radial bearing 114. In accordance with embodiments of the present disclosure, at least one component of the thrust bearing 112 may be capable of sliding radially relative to at least one other component of the thrust bearing 112 so as to accommodate the play in the radial bearing 114 in the radial direction, even though the thrust bearing 112 is in a state of compression with little to no play between the rolling cutter 106 and the head 105 in the axial direction.

For example, in the embodiment of FIG. 2, the at least substantially planar shaft washer 122 may be capable of sliding radially relative to the first plurality of bearings 126 and the second plurality of bearings 128 so as to accommodate the play in the radial bearing 114 in the radial direction. A clearance gap may be provided between the inner side surface of the shaft washer 122 and the adjacent outer side surface of the head 105 that is equal to or greater than the predetermined amount of clearance between the inner side surface of the annular sleeve 129 and the adjacent outer side surface of the head 105 in the radial bearing 114. As a non-limiting example, if the predetermined amount of clearance between the inner side surface of the annular sleeve 129 and the adjacent outer side surface of the head 105 in the radial bearing 114 is one hundred microns (100 µm), the clearance gap between the inner side surface of the shaft washer 122 and the adjacent outer side surface of the head 105 may be one hundred microns (100 µm) or more, one hundred fifty microns (150 µm) or more, or even two hundred fifty microns (250 µm) or more.

Furthermore, during operation of the drill bit 100, when the net force acting on the rolling cutter 106 is oriented so as to urge the rolling cutter 106 in the axial direction onto the head 105, such as during a normal drilling operation, the first plurality of bearings 126 may bear a higher compressive load than the second plurality of bearings 128. When the net force acting on the rolling cutter 106 is oriented so as to urge the rolling cutter 106 in the axial direction off the head 105, as may be encountered during a forward reaming operation or a backward reaming operation in which a previously drilled borehole is being enlarged by the drill bit 100, the second plurality of bearings 128 may bear a higher compressive load than the first plurality of bearings 128.

Figure 3:
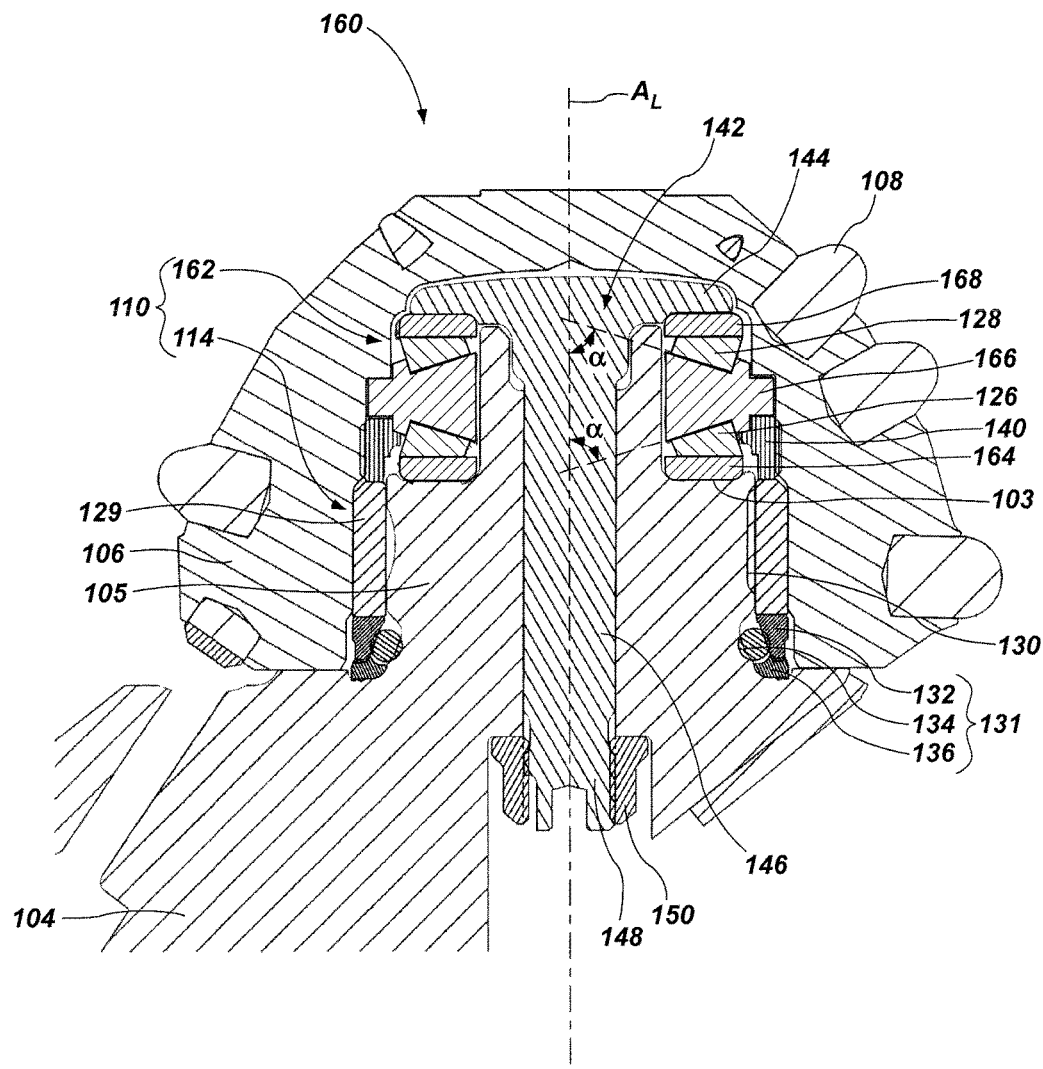
FIG. 3 is a cross-sectional view of a portion of a drill bit of similar to that of FIG. 2 illustrating a rolling cutter mounted on a corresponding head of a bit body of the drill bit with another embodiment of a bearing system as described herein between the rolling cutter and the head.

FIG. 3 is a cross-sectional view of a portion of a drill bit 160 similar to that of FIG. 2 and having a rolling cutter 106 mounted on a corresponding head 105 of a leg 104 of bit body 102 (FIG. 1) of the drill bit 160. The only difference between the drill bit 160 of FIG. 3 and the drill bit 100 of FIGS. 1 and 2 is the configuration of the thrust bearing of the bearing system 110. In particular, the drill bit 160 includes a thrust bearing 162 having a head washer 164, a shaft washer 166, and a rolling cutter washer 168. A first plurality of tapered roller bearings 126, as described with reference to FIG. 2, may be disposed between the head washer 164 and the shaft washer 166, and a second plurality of tapered roller bearings 126, as previously described with reference to FIG. 2, may be disposed between the shaft washer 166 and the rolling cutter washer 168.

In the embodiment of FIG. 3, however, the head washer 164 has an at least substantially planar upper surface oriented perpendicular to the longitudinal axis $A_L$, and the lower side surface of each of the first plurality of bearings 126 that rests upon the upper surface of the head washer 164 is oriented perpendicular to the longitudinal axis $A_L$. Similarly, the rolling cutter washer 168 has an at least substantially planar lower surface oriented perpendicular to the longitudinal axis $A_L$, and the upper side surface of each of the second plurality of bearings 128 that bears against the lower surface of the rolling cutter washer 168 is oriented perpendicular to the longitudinal axis $A_L$.

In addition, in the embodiment of FIG. 3, the shaft washer 166 is not substantially planar. The lower surface of the shaft washer 166 may comprise an angled, frustoconically-shaped surface oriented at the angle α to the longitudinal axis $A_L$ so as to be complementary to upper surfaces of the first plurality of bearings 126. In addition, the lower surface of the shaft washer 166 has a downward axially projecting lip that extends along at least a portion of a radially outer end surface of each of the first plurality of bearings 126. The downward axially projecting lip and the angled, frustoconically-shaped lower surface of the shaft washer 166 prevent the first plurality of bearings 126 from sliding in the radial direction relative to the shaft washer 166 during operation of the drill bit 100. The upper surface of the shaft washer 166 may comprise an angled, frustoconically-shaped upper surface oriented at the angle α to the longitudinal axis $A_L$ so as to be complementary to lower surfaces of the second plurality of bearings 128. In addition, the upper surface of the shaft washer 166 has an upward axially projecting lip that extends along at least a portion of a radially outer end surface of each of the second plurality of bearings 128. The upward axially projecting lip and the angled, frustoconically-shaped upper surface of the shaft washer 166 prevent the second plurality of bearings 128 from sliding in the radial direction relative to the shaft washer 166 during operation of the drill bit 160.

In this configuration, the non-planar shaft washer 122, together with the first plurality of tapered roller bearings 126 and the second plurality of tapered roller bearings 128, may be capable of sliding radially relative to the head washer 164 and the rolling cutter washer 168 so as to accommodate the play in the radial bearing 114 in the radial direction. A clearance gap may be provided between the inner side surface of the shaft washer 166 and the adjacent outer side surface of the head 105 that is equal to or greater than the predetermined amount of clearance between the inner side surface of the annular sleeve 129 and the adjacent outer side surface of the head 105 in the radial bearing 114, as described above with reference to FIG. 2. The head washer 164 and the rolling cutter washer 168 may be fixed in position relative to the head 105 as previously described with reference to FIG. 2.

In additional embodiments, the head washer 164 may be integrally formed with, and comprise an integral portion of the head 105. Similarly, in additional embodiments, the rolling cutter washer 168 may be integrally formed with, and comprise an integral portion of the tensioner bolt 142.

Figure 4:
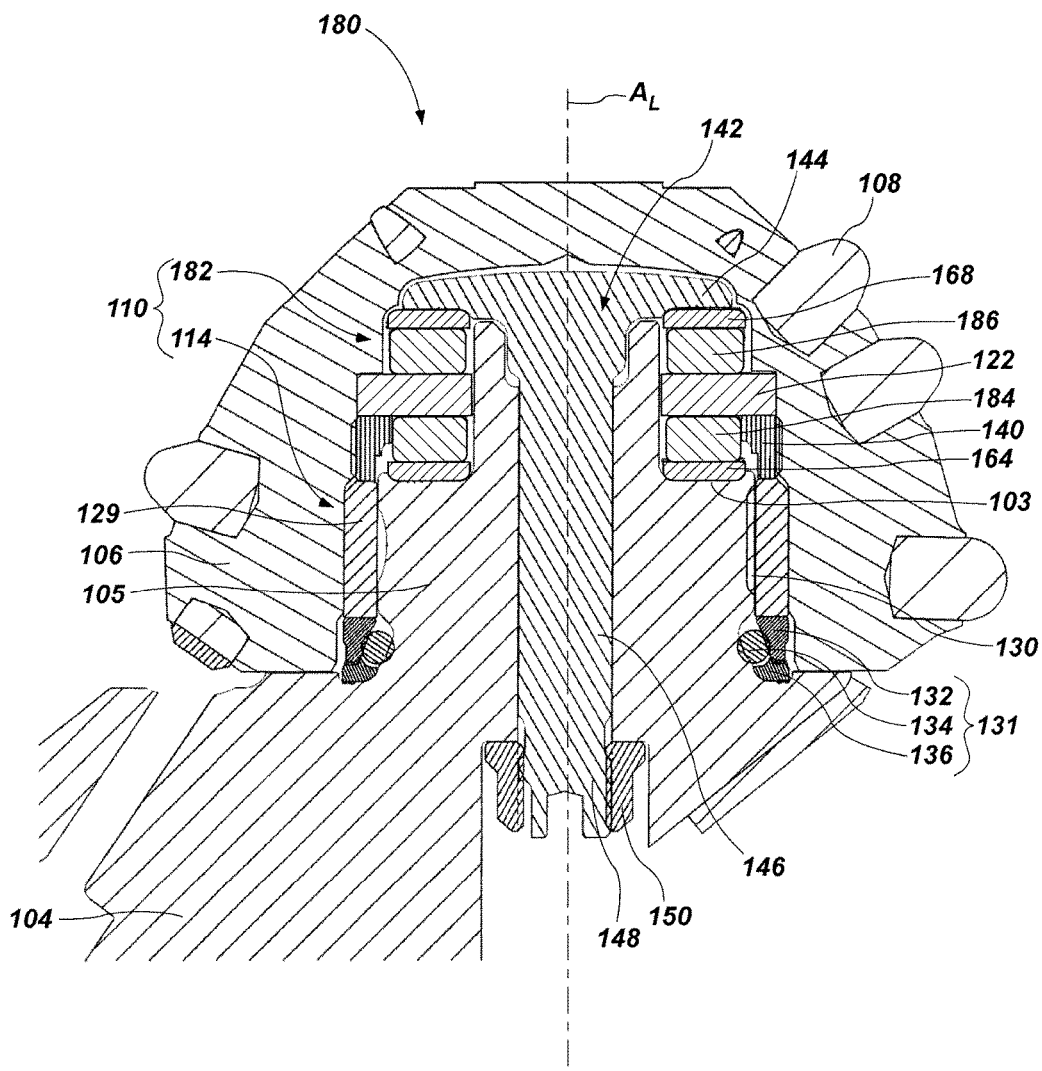
FIG. 4 is a cross-sectional view of a portion of a drill bit of similar to that of FIGS. 2 and 3 illustrating a rolling cutter mounted on a corresponding head of a bit body of the drill bit with another embodiment of a bearing system as described herein between the rolling cutter and the head.

FIG. 4 is a cross-sectional view of a portion of a drill bit 180 similar to that of FIGS. 2 and 3, and having a rolling cutter 106 mounted on a corresponding head 105 of a leg 104 of bit body 102 of the drill bit 180. The difference between the drill bit 180 of FIG. 4 and the drill bits 100 of FIGS. 1 and 2 and the drill bit 160 of FIG. 3 is the configuration of the thrust bearing 182 of the bearing system 110. In particular, the drill bit 180 includes a thrust bearing 182 having a head washer 164 as previously described with reference to FIG. 3, a shaft washer 122 as previously described with reference to FIG. 2, and a rolling cutter washer 168 as previously described with reference to FIG. 3. The thrust bearing 182 further includes a first plurality of cylindrical roller bearings 184 disposed between the head washer 164 and the shaft washer 122, and a second plurality of cylindrical roller bearings 186 disposed between the shaft washer 122 and the rolling cutter washer 168.

In the embodiment of FIG. 4, the head washer 164 has an at least substantially planar upper surface and each of the first plurality of cylindrical roller bearings 184 have substantially planar lower surfaces that are oriented perpendicular to the longitudinal axis $A_L$. Similarly, the rolling cutter washer 168 has an at least substantially planar lower surface and each of the second plurality of cylindrical roller bearings 186 have substantially planar upper surfaces that are oriented perpendicular to the longitudinal axis $A_L$. Similarly, the shaft washer 122 has at least substantially planar upper and lower surfaces oriented perpendicular to the longitudinal axis $A_L$, and the upper side surface of each of the first plurality of cylindrical roller bearings 184 and the lower side surface of each of the second plurality of cylindrical roller bearings 186 are oriented perpendicular to the longitudinal axis $A_L$.

In this configuration, the planar shaft washer 122, the first plurality of cylindrical roller bearings 184, and the second plurality of cylindrical roller bearings 184 may be capable of sliding radially relative to head washer 164 and the rolling cutter washer 168 so as to accommodate the play in the radial bearing 114 in the radial direction. A clearance gap may be provided between the inner side surface of the shaft washer 122 and the adjacent outer side surface of the head 105 that is equal to or greater than the predetermined amount of clearance between the inner side surface of the annular sleeve 129 and the adjacent outer side surface of the head 105 in the radial bearing 114, as described above with reference to FIG. 2. The head washer 164 and the rolling cutter washer 168 may be fixed in position relative to the head 105 as previously described with reference to FIG. 2. In addition, a clearance gap may be provided between the inner side surface of each of the first plurality of cylindrical roller bearings 184 and each of the second plurality of cylindrical roller bearings 186, and the adjacent outer side surface of the head 105 that is equal to or greater than the predetermined amount of clearance between the inner side surface of the annular sleeve 129 and the adjacent outer side surface of the head 105 in the radial bearing 114.

In additional embodiments, the head washer 164 may be integrally formed with, and comprise an integral portion of the head 105. Similarly, in additional embodiments, the rolling cutter washer 168 may be integrally formed with, and comprise an integral portion of the tensioner bolt 142.

FIG. 5 is a cross-sectional view of a portion of a drill bit 190 similar to that of FIGS. 2 and 3, and having a rolling cutter 106 mounted on a corresponding head 105 of a bit body 102 of the drill bit 190. The difference between the drill bit 190 of FIG. 5 and the drill bits 100, 160, 180 previously described herein is the configuration of the thrust bearing 192 of the bearing system 110. In particular, the drill bit 190 includes a thrust bearing 192 having a head washer 164 as previously described with reference to FIG. 3, a shaft washer 122 as previously described with reference to FIG. 2, and a rolling cutter washer 168 as previously described with reference to FIG. 3. The thrust bearing 182 further includes a first plurality of polycrystalline diamond compact (PDC) bearings 194 disposed between the head washer 164 and the shaft washer 122, and a second plurality of PDC bearings 200 disposed between the shaft washer 122 and the rolling cutter washer 168.

In the embodiment of FIG. 5, the head washer 164 has an at least substantially planar upper surface, and the shaft washer 122 has an at least substantially planar lower surface. The first plurality of PDC bearings 194 includes a first set of non-rolling PDC bearing elements 196 each including a volume of polycrystalline diamond material, and an opposing second set of non-rolling PDC bearing elements 198 each including a volume of polycrystalline diamond material. The polycrystalline diamond material of the second set of PDC bearing elements 198 is located and configured to abut against and slide relative to the polycrystalline diamond material of the first set of PDC bearing elements 196 during operation of the bearing system 110. The first set of PDC bearing elements 196 may be statically fixed to the head washer 120 and the head 105, and the second set of PDC bearing elements 198 may be fixed to the shaft washer 122 and the rolling cutter 106, such that the second set of PDC bearing elements 198 slide against and past the first set of PDC bearing elements 196 along the interface therebetween during rotation of the rolling cutter 106 relative to the head 105. The interface between the first set of PDC bearings 196 and the second set of PDC bearings 198 is generally planar and oriented perpendicular to the longitudinal axis $A_L$.

Similarly, the rolling cutter washer 168 has an at least substantially planar lower surface, and the shaft washer 122 has an at least substantially planar upper surface. The second plurality of PDC bearings 200 includes a first set of non-rolling PDC bearing elements 202 each including a volume of polycrystalline diamond material, and an opposing second set of non-rolling PDC bearing elements 204 each including a volume of polycrystalline diamond material. The polycrystalline diamond material of the second set of PDC bearing elements 204 is located and configured to abut against and slide relative to the polycrystalline diamond material of the first set of PDC bearing elements 202 during operation of the bearing system 110. The first set of PDC bearing elements 202 may be statically fixed to the rolling cutter washer 168 and the head 105, and the second set of PDC bearing elements 204 may be fixed to the shaft washer 122 and the rolling cutter 106, such that the second set of PDC bearing elements 204 slide against and past the first set of PDC bearing elements 202 along the interface therebetween during rotation of the rolling cutter 106 relative to the head 105. The interface between the first set of PDC bearing elements 202 and the second set of PDC bearing elements 204 is generally planar and oriented perpendicular to the longitudinal axis $A_L$.

In this configuration, the planar shaft washer 122, the second set of PDC bearing elements 198 of the first plurality of PDC bearings 194, and the second set of PDC bearing elements 204 of the second plurality of PDC bearings 200 are capable of sliding radially relative to head washer 164, the first set of PDC bearing elements 196 of the first plurality of PDC bearings 194, the rolling cutter washer 168, and the first set of PDC bearing elements 202 of the second plurality of PDC bearings 200 so as to accommodate the play in the radial bearing 114 in the radial direction. A clearance gap may be provided between the inner side surface of the shaft washer 122 and the adjacent outer side surface of the head 105 that is equal to or greater than the predetermined amount of clearance between the inner side surface of the annular sleeve 129 and the adjacent outer side surface of the head 105 in the radial bearing 114, as described above with reference to FIG. 2. The head washer 164 and the rolling cutter washer 168 may be fixed in position relative to the head 105 as previously described with reference to FIG. 2. In addition, a clearance gap may be provided between the inner side surface of each of the second plurality of PDC bearings 200 and each of the second plurality of PDC bearings 186, and the adjacent outer side surface of the head 105 that is equal to or greater than the predetermined amount of clearance between the inner side surface of the annular sleeve 129 and the adjacent outer side surface of the head 105 in the radial bearing 114.

Figure 6:
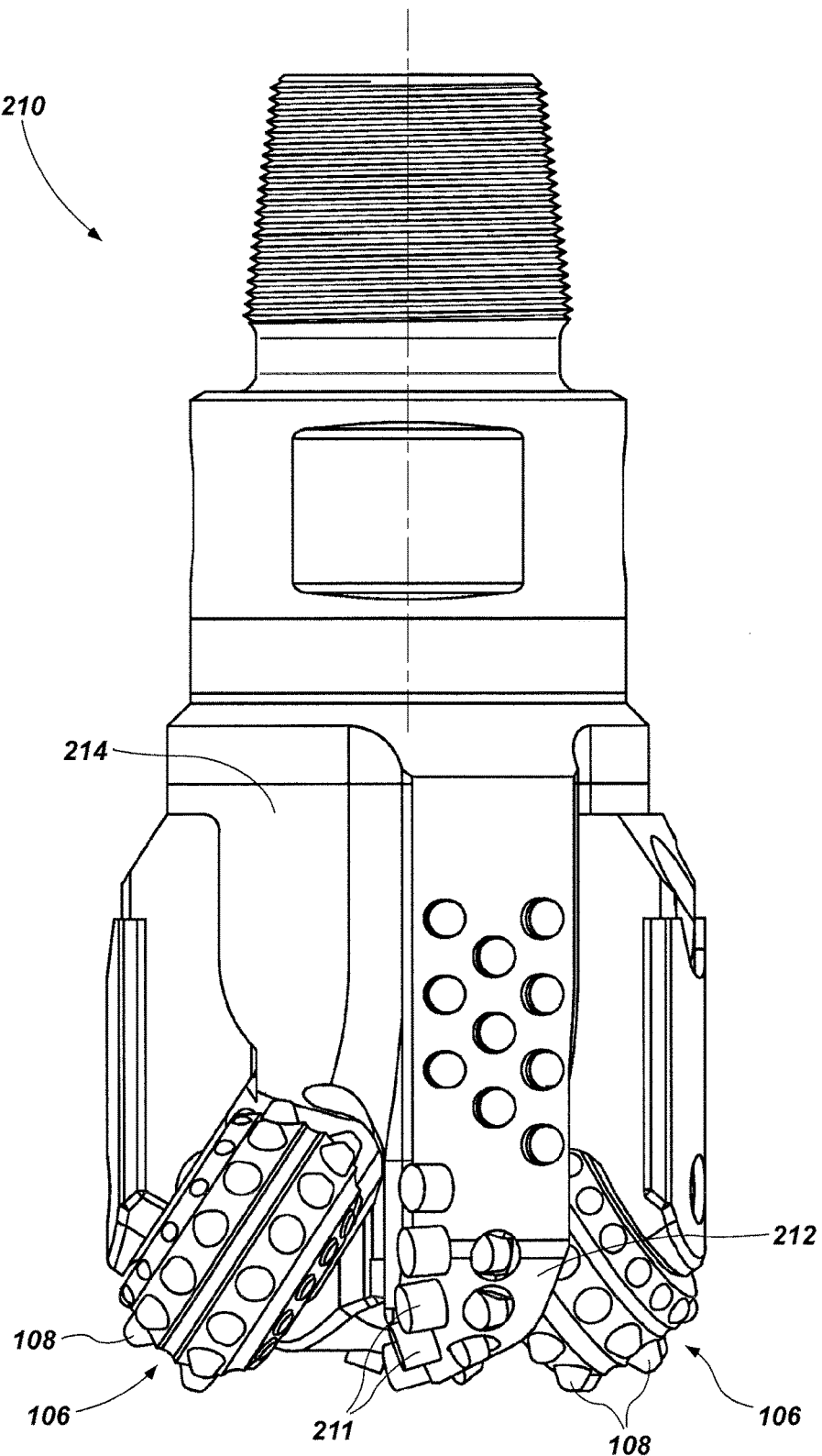
FIG. 6 is a side view of a downhole tool in the form of a hybrid earth-boring rotary drill bit including rolling cutters and fixed cutting elements mounted on blades, wherein the rolling cutters may be mounted on corresponding heads with bearing systems as described herein between the rolling cutters and the corresponding heads.

As previously mentioned, the bearing systems described herein may be employed in other types of downhole tools. As another non-limiting example of such a downhole tool, FIG. 6 illustrates an earth-boring rotary hybrid drill bit 210 that includes rolling cutters 106 having cutting structures 108 thereon, as previously described with reference to FIGS. 1 and 2, as well as fixed cutting elements 211 mounted on stationary blades 212. The blades 212 may be integral parts of a bit body 214 of the hybrid drill bit 210. In addition, the heads 105 to which the rolling cutters 106 are respectively mounted also may be may be integral parts of the bit body 214 of the hybrid drill bit 210. A bearing system 110 as previously described herein with reference to any of FIGS. 2 through 5 may be provided between each of the rolling cutters 106 and the corresponding head 105 to which it is respectively mounted.

Additional non-limiting example embodiments of the present disclosure are set forth below.

Embodiment 1: A bearing system configured for use on a downhole tool including a rolling cutter member, the rolling cutter member including a plurality of cutting structures, comprising: a head washer; an at least substantially planar shaft washer; a first plurality of bearings disposed between the head washer and the at least substantially planar shaft washer; a rolling cutter washer; and a second plurality of bearings disposed between the at least substantially planar shaft washer and the rolling cutter washer.

Embodiment 2: The bearing system of Embodiment 1, wherein at least one of the first plurality of bearings and the second plurality of bearings comprises rolling bearing elements.

Embodiment 3: The bearing system of Embodiment 2, wherein the rolling bearing elements comprise tapered rolling bearing elements.

Embodiment 4: The bearing system of Embodiment 2, wherein the rolling bearing elements comprise cylindrical rolling bearing elements.

Embodiment 5: The bearing system of Embodiment 1, wherein at least one of the first plurality of bearings and the second plurality of bearings comprises opposing sets of non-rolling bearing elements each including a volume of polycrystalline diamond material, the polycrystalline diamond material of a first set of the opposing sets configured to abut against and slide relative to the polycrystalline diamond material of a set of the opposing sets during operation of the bearing system.

Embodiment 6: The bearing system of any one of Embodiments 1 through 5, wherein the substantially planar shaft washer has an outer diameter of 6.5 centimeters or less.

Embodiment 7: An earth-boring tool configured for use in a subterranean formation, comprising: a tool body including at least one head; and a rolling cutter mounted on the at least one head; and a bearing system disposed between the at least one head and the rolling cutter mounted on the at least one head, the bearing system including: a head washer disposed on the at least one head; an at least substantially planar shaft washer retained within the rolling cutter and disposed around the at least one head; a first plurality of bearings disposed between the head washer and the at least substantially planar shaft washer; a rolling cutter washer retained within the rolling cutter; and a second plurality of bearings disposed between the at least substantially planar shaft washer and the rolling cutter washer.

Embodiment 8: The earth-boring tool of Embodiment 1, wherein the bearing system comprises a thrust bearing system, and wherein at least one component of the thrust bearing system is capable of sliding in a radial direction relative to at least one other component of the thrust bearing system so as to provide a selected degree of radial play between the rolling cutter and the at least one head.

Embodiment 9: The earth-boring tool of Embodiment 7 or Embodiment 8, wherein the earth-boring tool comprises a rolling cutter earth-boring rotary drill bit.

Embodiment 10: The earth-boring tool of Embodiment 7 or Embodiment 8, wherein the earth-boring tool comprises an earth-boring rotary hybrid drill bit.

Embodiment 11: The earth-boring tool of Embodiment 7 or Embodiment 8, wherein the earth-boring tool comprises a reamer configured to enlarge a diameter of a previously drilled wellbore.

Embodiment 12: The earth-boring tool of any one of Embodiments 7 through 11, wherein the at least substantially planar shaft washer is configured to slide in the radial direction relative to the first plurality of bearings and the second plurality of bearings.

Embodiment 13: The earth-boring tool of any one of Embodiments 7 through 12, wherein at least one of the first plurality of bearings and the second plurality of bearings comprises rolling bearing elements.

Embodiment 14: The earth-boring tool of Embodiment 13, wherein the rolling bearing elements comprise tapered rolling bearing elements.

Embodiment 15: The earth-boring tool of Embodiment 13, wherein the rolling bearing elements comprise cylindrical rolling bearing elements.

Embodiment 16: The earth-boring tool of any one of Embodiments 7 through 12, wherein at least one of the first plurality of bearings and the second plurality of bearings comprises opposing sets of non-rolling bearing elements each including a volume of polycrystalline diamond material, the polycrystalline diamond material of a first set of the opposing sets configured to abut against and slide relative to the polycrystalline diamond material of a set of the opposing sets during operation of the bearing system.

Embodiment 17: The earth-boring tool of any one of Embodiments 7 through 16, wherein the head washer is integrally formed with, and comprises an integral portion of the head.

Embodiment 18: A method of forming an earth-boring tool configured for use in a subterranean formation, comprising: inserting a tensioner bolt into a rolling cutter; inserting a rolling cutter washer into the rolling cutter; providing a plurality of bearings on the rolling cutter washer within the rolling cutter; inserting a substantially planar shaft washer into the rolling cutter such that bearings of the plurality of bearings are disposed between the rolling cutter washer and the at least substantially planar shaft washer; providing a retaining member within the rolling cutter to retain the at least substantially planar shaft washer, the plurality of bearings, the rolling cutter washer, and the tensioner bolt within the rolling cutter; positioning a head washer over and around a head of a tool body of the earth-boring tool; providing an additional plurality of bearings on the head washer; and positioning the rolling cutter on the head such that the tensioner bolt extends through the head, and such that the plurality of bearings is disposed between the head washer and the at least substantially planar shaft washer retained within the rolling cutter; and securing the tensioner bolt to the head to secure the rolling cutter to the head and tensioning the tensioner bolt to compress the additional plurality of bearings between the head washer and the at least substantially planar shaft washer, and to compress the plurality of bearings between the at least substantially planar shaft washer and the rolling cutter washer.

Embodiment 19: The method of Embodiment 18, further comprising selecting at least one of the plurality of bearings and the additional plurality of bearings to comprise rolling bearing elements.

Embodiment 20: The method of Embodiment 18, further comprising selecting the rolling bearing elements to comprise tapered rolling bearing elements.

Embodiment 21: The method of Embodiment 18, further comprising selecting the rolling bearing elements to comprise cylindrical rolling bearing elements.

While the present disclosure has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

What is claimed is:

1. A bearing system configured for use on a downhole tool including a rolling cutter member, the rolling cutter member including a plurality of cutting structures, comprising:
   a head washer;
   an at least substantially planar shaft washer;
   a first plurality of bearings disposed between the head washer and the at least substantially planar shaft washer;
   a rolling cutter washer; and
   a second plurality of bearings disposed between the at least substantially planar shaft washer and the rolling cutter washer;
   wherein the at least substantially planar shaft washer is directly interposed between, and in contact with, the first plurality of bearings and the second plurality of bearings.

2. The bearing system of claim 1, wherein at least one of the first plurality of bearings and the second plurality of bearings comprises rolling bearing elements.

3. The bearing system of claim 2, wherein the rolling bearing elements comprise tapered rolling bearing elements.

4. The bearing system of claim 2, wherein the rolling bearing elements comprise cylindrical rolling bearing elements.

5. The bearing system of claim 1, wherein at least one of the first plurality of bearings and the second plurality of bearings comprises opposing sets of non-rolling bearing elements each including a volume of polycrystalline diamond material, the polycrystalline diamond material of a first set of the opposing sets configured to abut against and slide relative to the polycrystalline diamond material of a set of the opposing sets during operation of the bearing system.

6. The bearing system of claim 1, wherein the head washer is integrally formed with, and comprises an integral portion of a head.

7. An earth-boring tool configured for use in a subterranean formation, comprising at least the following components:
   a tool body including at least one head; and
   a rolling cutter mounted on the at least one head; and
   a bearing system disposed between the at least one head and the rolling cutter mounted on the at least one head, the bearing system including:
   a head washer disposed on the at least one head;
   an at least substantially planar shaft washer retained within the rolling cutter and disposed around the at least one head;
   a first plurality of bearings disposed between the head washer and the at least substantially planar shaft washer;
   a rolling cutter washer retained within the rolling cutter; and
   a second plurality of bearings disposed between the at least substantially planar shaft washer and the rolling cutter washer;
   wherein the at least substantially planar shaft washer is directly interposed between, and in contact with, the first plurality of bearings and the second plurality of bearings.

8. The earth-boring tool of claim 7, wherein the bearing system comprises a thrust bearing system, and wherein at least one of the components of the thrust bearing system is capable of sliding in a radial direction relative to at least one other of the components of the thrust bearing system so as to provide a selected degree of radial play between the rolling cutter and the at least one head.

9. The earth-boring tool of claim 7, wherein the earth-boring tool comprises a rolling cutter earth-boring rotary drill bit.

10. The earth-boring tool of claim 7, wherein the earth-boring tool comprises an earth-boring rotary hybrid drill bit.

11. The earth-boring tool of claim 7, wherein the earth-boring tool comprises a reamer configured to enlarge a diameter of a previously drilled wellbore.

12. The earth-boring tool of claim 7, wherein the at least substantially planar shaft washer is configured to slide in the radial direction relative to the first plurality of bearings and the second plurality of bearings.

13. The earth-boring tool of claim 7, wherein at least one of the first plurality of bearings and the second plurality of bearings comprises rolling bearing elements.

14. The earth-boring tool of claim 13, wherein the rolling bearing elements comprise tapered rolling bearing elements.

15. The earth-boring tool of claim 13, wherein the rolling bearing elements comprise cylindrical rolling bearing elements.

16. The earth-boring tool of claim 7, wherein at least one of the first plurality of bearings and the second plurality of bearings comprises opposing sets of non-rolling bearing elements each including a volume of polycrystalline diamond material, the polycrystalline diamond material of a first set of the opposing sets configured to abut against and slide relative to the polycrystalline diamond material of a set of the opposing sets during operation of the bearing system.

17. The earth-boring tool of claim 7, wherein the head washer is integrally formed with, and comprises an integral portion of the at least one head.

18. A method of forming an earth-boring tool configured for use in a subterranean formation, comprising:
   inserting a tensioner bolt into a rolling cutter;
   inserting a rolling cutter washer into the rolling cutter;
   providing a plurality of bearings on the rolling cutter washer within the rolling cutter;
   inserting a substantially planar shaft washer into the rolling cutter such that the bearings of the plurality of bearings are disposed between the rolling cutter washer and the at least substantially planar shaft washer;
   providing a retaining member within the rolling cutter to retain the at least substantially planar shaft washer, the plurality of bearings, the rolling cutter washer, and the tensioner bolt within the rolling cutter;
   positioning a head washer over and around a head of a tool body of the earth-boring tool;
   providing an additional plurality of bearings on the head washer, such that the at least substantially planar shaft washer is directly interposed between, and in contact with, the bearings on the rolling cutter washer and the additional plurality of bearings on the head washer;
   positioning the rolling cutter on the head such that the tensioner bolt extends through the head, and the plurality of bearings on the rolling cutter washer is disposed between the head washer and the at least substantially planar shaft washer retained within the rolling cutter; and
   securing the tensioner bolt to the head to secure the rolling cutter to the head and tensioning the tensioner bolt to compress the additional plurality of bearings between the head washer and the at least substantially planar shaft washer, and to compress the plurality of bearings between the at least substantially planar shaft washer and the rolling cutter washer.

19. The method of claim 18, further comprising selecting at least one of the plurality of bearings and the additional plurality of bearings to comprise rolling bearing elements.

20. The method of claim 19, further comprising selecting the rolling bearing elements to comprise tapered rolling bearing elements.

21. The method of claim 19, further comprising selecting the rolling bearing elements to comprise cylindrical rolling bearing elements.

* * * * *